United States Patent [19]

Garcia, Jr. et al.

[11] Patent Number: 5,810,292
[45] Date of Patent: Sep. 22, 1998

[54] AERIAL REFUELING SYSTEM WITH TELESCOPING REFUELING PROBE

[75] Inventors: Frank Garcia, Jr., Walnut; Walter Nasarfnko, Woodland Hills; Herach Haroutunians, Mission Viejo, all of Calif.

[73] Assignee: Sargent Fletcher, Inc., El Monte, Calif.

[21] Appl. No.: 687,143

[22] Filed: Jul. 24, 1996

[51] Int. Cl.⁶ .................................................. B64D 39/00
[52] U.S. Cl. ....................... 244/135 A; 141/388; 137/615
[58] Field of Search ........................... 244/135 R, 135 A, 244/136; 141/387, 388; 137/899.2, 615; 138/120

[56] References Cited

U.S. PATENT DOCUMENTS

| | | | |
|---|---|---|---|
| 2,849,200 | 8/1958 | Person | 244/135 A |
| 2,946,605 | 7/1960 | Moshewr | 244/135 A |
| 2,967,684 | 1/1961 | Knecht | 244/135 A |
| 3,061,246 | 10/1962 | Kirby . | |
| 3,100,614 | 8/1963 | Morrow . | |
| 3,439,700 | 4/1969 | Preston | 137/615 |
| 3,476,140 | 11/1969 | Jusyk | 244/135 A |
| 3,674,049 | 7/1972 | Macregor | 244/135 A |
| 4,095,761 | 6/1978 | Anderson et al. . | |
| 4,396,126 | 8/1983 | Moravec et al. . | |
| 4,540,144 | 9/1985 | Perrella . | |
| 4,633,376 | 12/1986 | Newman . | |
| 5,667,170 | 9/1997 | Moss et al. | 244/135 A |

FOREIGN PATENT DOCUMENTS

740334  11/1955  United Kingdom .

*Primary Examiner*—Galen L. Barefoot
*Attorney, Agent, or Firm*—Edward A. Sokolski

[57] ABSTRACT

A refueling tank has a telescopic refueling probe formed by a plurality of telescoping tubes which are actuable for extension and retraction from an existing pylon mounted jettisonable external fuel tank on the wing of an aircraft. The telescopic drive action is achieved by a drive mechanism including a motor and a jack screw mechanism which operates to extend and retract the telescoping tubes slidably mounted, one on the other. The probe when fully retracted is completely enclosed within the associated fuel tank assembly resulting in no additional drag or lift on the aircraft and keeping the probe concealed.

15 Claims, 8 Drawing Sheets

AERIAL REFUELING SYSTEM WITH TELESCOPING REFUELING PROBE

BACKGROUND OF THE INVENTION

1. Field of the Invention

This invention relates to an aerial refueling tank with a telescoping refueling system and more particular to such a device which is integrated into an existing wing pylon mounted fuel tank for use in the in-flight refueling of an aircraft.

2. Description of the Related Art.

In flight aircraft refueling systems have been in use for many years. Such systems generally employ what is known as a "hose reel and drogue system." Such systems are described in the following U.S. Pat. No. 3,100,614 issued Aug. 13, 1963 to Morrow; U.S. Pat. No. 3,061,246 issued Oct. 30, 1962 to Kirby; U.S. Pat. No. 4,633,376 issued Dec. 30, 1986 to Newman; U.S. Pat. No. 4,095,761 issued Jun. 20, 1978 to Anderson et al; U.S. Pat. No. 4,540,144 issued Sep. 10, 1985 to Perrella; and UK patent no. 740,334 filed Apr. 27, 1954 by Boeing.

In all of such systems except that of Perrella, the aerial refueling probe of the aircraft being refueled is a fixed unit protruding from the fueling tank of the aircraft. In Perrella, a telescoping fuel probe driven by fuel pressure is described. This unit is relatively short and is retracted into a housing which is mounted on the fuselage of the aircraft. In the fully retracted position of this probe the fueling nozzle protrudes from the housing.

In such systems of the prior art, all or a substantial portion of the fueling probe or its housing extends into the air stream not just when fueling but at all times. This adds undesirable drag and/or lift to the aircraft. Further, such visible units immediately indicate to unfriendly observers that the aircraft is capable of long range operations which information can have strategic disadvantages in military operations.

Also, in many of the prior aerial refueling systems, it is difficult for the pilot to conveniently observe the fueling probe during the fueling operation. This, of course, makes the joinder of the probe and drogue more difficult and may require the assistance of another member of the flight crew. In a fighter plane with only a single pilot, it is essential that the pilot have full view of the probe to facilitate the joining of the probe with the drogue.

BRIEF SUMMARY OF THE INVENTION

The system of the present invention is a significant improvement over prior art aerial refueling systems in providing a telescoping probe which extends far enough out at a proper angle so that it can readily be observed by the pilot during fueling and which is fully retracted into a fuel tank pylon so that it does not contribute aerodynamic lift or drag to the aircraft and cannot be observed when not fueling.

The system of the invention employs a plurality of telescoping tube members, the innermost of such members having a fuel nozzle on its distal end. The telescoping members are driven between extended and retracted positions by means of a motor which may be electric or pneumatic. In its retracted position the telescoping members are completely contained within a fueling pylon or other external fuel tank of the aircraft. A "dry" compartment is provided for the motor within the tank to isolate the motor from the fuel.

In its extended position, the probe nozzle of the innermost tube extends out far enough and at a angle relative to the aircraft so that it can readily be seen by the pilot from the cockpit.

The rotational drive of the motor is converted to a linear drive by means of an elongated jack screw which engages a nut member fixedly attached to the innermost tube such that the rotational motion of the motor causes linear movement of the innermost tube. The other extensible telescoping tubes of which there may be one, two, or more are likewise linearly driven in response to the rotational drive of the motor either by means of a second jack screw or a slidable drive.

The telescoping tubes are retracted into the fuel tank by reversing the rotation of the motor which reverses the linear motion of the tubes.

It is therefore an object of the invention to provide an improved aerial fueling system using a probe and drogue type fueling connection.

It is a further object of the invention to provide an aerial fueling system utilizing telescoping tubes which can be fully retracted into the aircraft fuel tank.

It is a still further object of the invention to provide an aerial fueling system in which the fueling probe can readily be observed by the pilot from the cockpit.

Other objects of the invention will become apparent in connection with the following description in conjunction with the accompanying drawings.

DETAILED DESCRIPTION OF THE INVENTION

Figure 1:
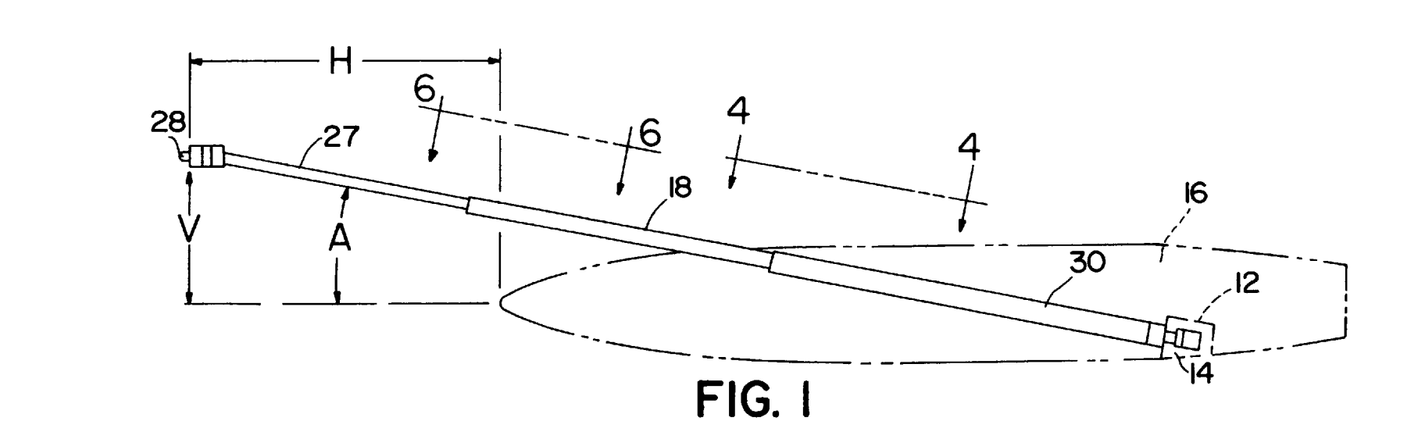
FIG. 1 is a side elevational schematic view of the probe in its extended position.
Figure 2:
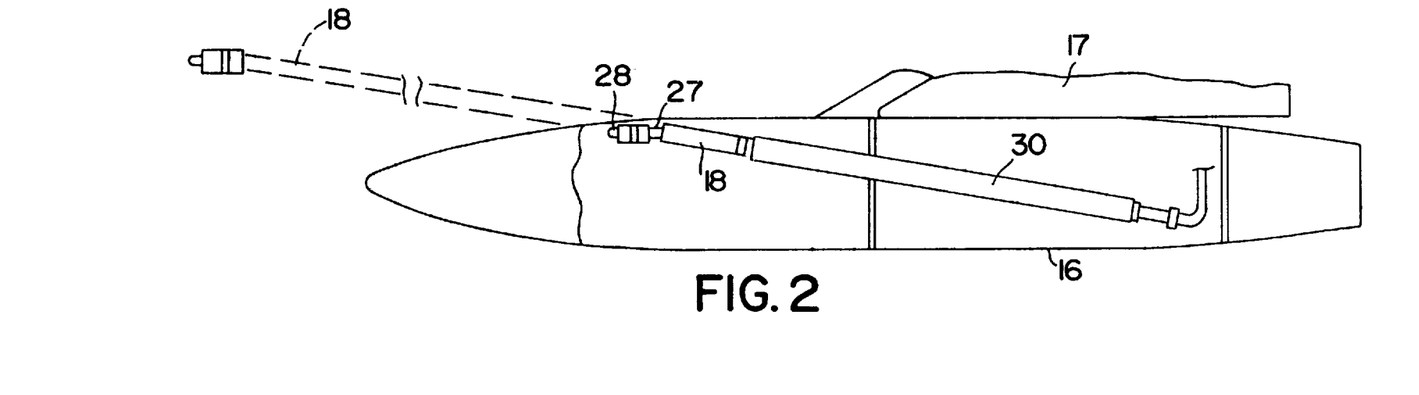
FIG. 2 is a side elevational schematic view with cutaway section illustrating the probe retracted into the fueling tank.

Referring to FIGS. 1 and 2, the system of the invention is shown in the extended and retracted positions respectively.

Fixed tube 30 is fixed mounted on the outer wall of compartment 14 which houses motor 12. Compartment 14, which is mounted on the bottom wall of fuel tank 16 is fluid tight so that the motor is isolated from the fuel in the tank and thus kept dry. Fuel tank 16 may be a pylon mounted on the underside of the wing 17 of the aircraft. In the retracted position, as shown in FIG. 2, middle tube 18 telescopes into outer fixed tube 30 and inner tube 27 telescopes into middle tube 18. Inner tube has a probe nozzle 28 on its distal end for mating with a drogue in feeding fuel into tank 16.

Referring to FIG. 1, for convenient viewing by the pilot during fueling, the probe 28 should extend out from the pylon a proper horizontal distance "H", at a proper vertical height,"V," and at a proper angle, "A" for the particular aircraft. The optimum parameters should be determined experimentally for each installation. For an F-16 aircraft, these parameters have been determined to be, as follows: "H"=84 inches; "A"=10 degrees; "V"=34 inches.

Referring now to FIGS. 3–9a, the drive mechanism for driving the device between its retracted and extended positions is illustrated.

Figure 3:
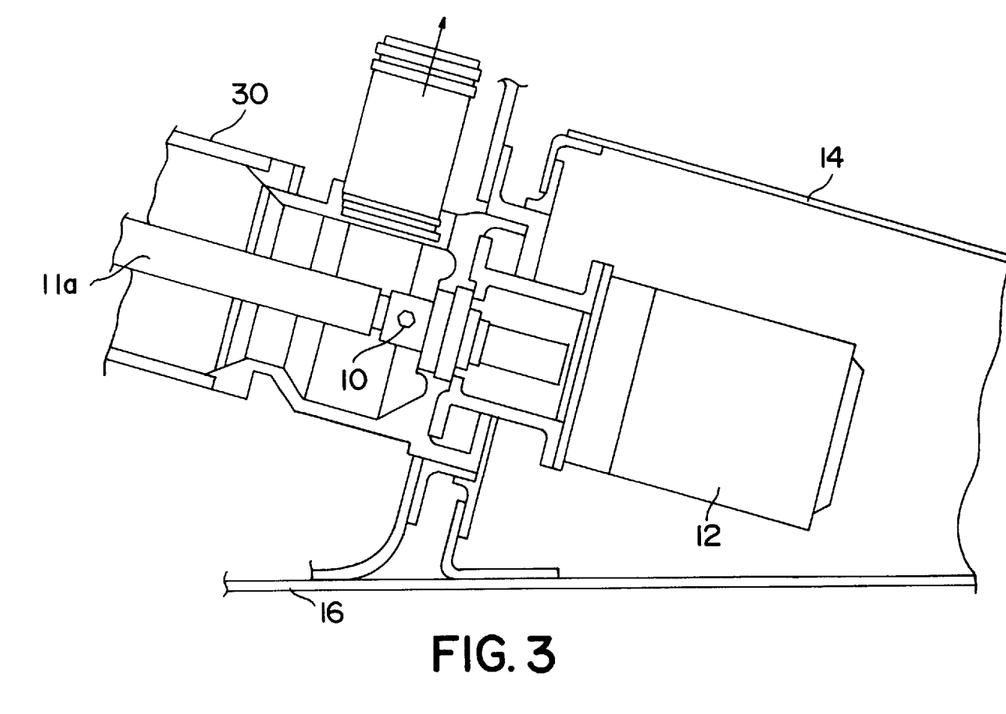
FIG. 3 is a side elevational view illustrating the motor drive.
Figure 4:
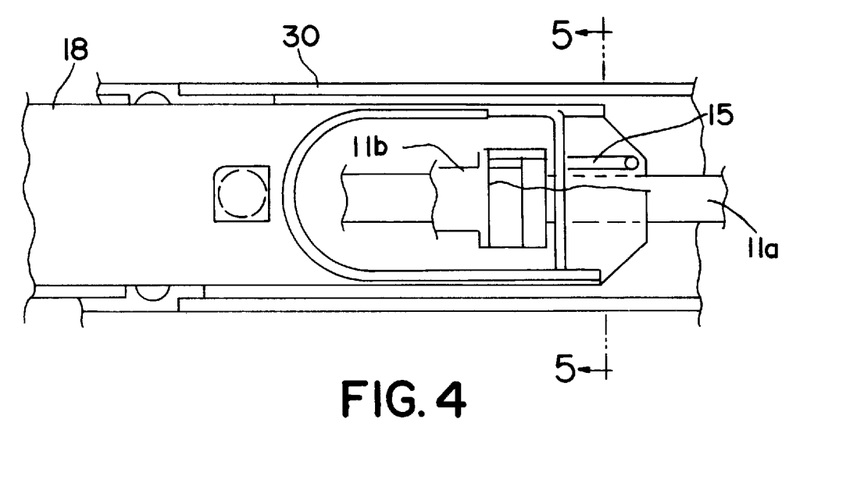
FIG. 4 is a cross sectional view taken along the plane indicated by 4—4 in FIG. 1.
Figure 5:
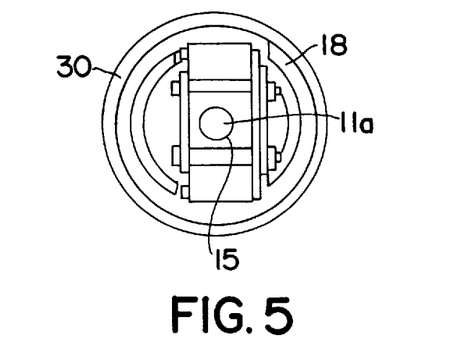
FIG. 5 is a cross sectional view taken along the plane indicated by 5—5 in FIG. 4.

As shown in FIG. 3, drive motor 12 which may be an electrical or hydraulic motor is supported within liquid tight or "dry" compartment 14 which is mounted on the floor of fuel tank 16. The drive shaft of the motor is fixedly attached to threaded shaft or jack screw 11a by means of bolt 10. Jack screw 11a is threaded along substantially its entire length and, as can best be seen in FIGS. 4 and 5, threadably engages barrel nut member 15 which is fixedly attached to primary extension tube 18. The barrel nut assembly is prevented from rotating by the frictional resistance to rotation of primary extension tube 18 and thus with rotation of jack screw 11a extension tube 18 is driven linearly.

Figure 6:
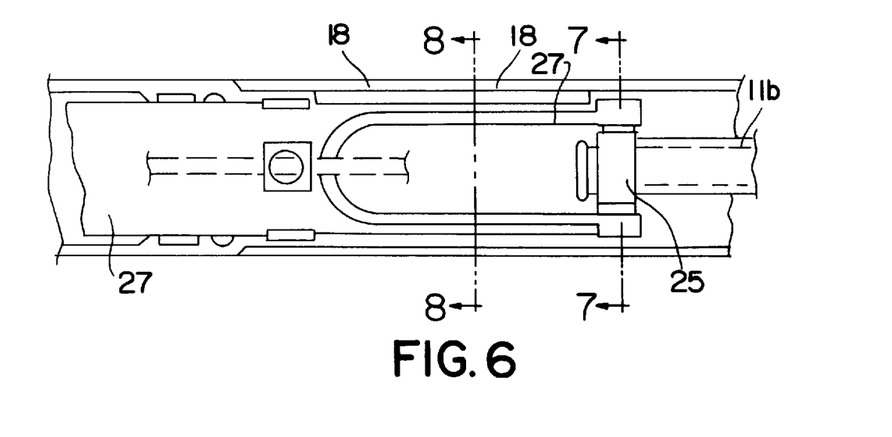
FIG. 6 is a cross sectional view taken along the plane indicated by 6—6 in FIG. 1 and illustrating the operation of the secondary jack screw and barrel nut.
Figure 7:
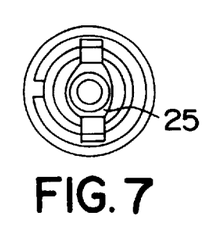
FIG. 7 is a cross sectional view taken along the plane indicated by 7—7 in FIG. 6.
Figure 8:
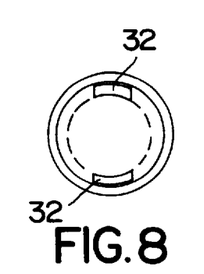
FIG. 8 is a cross sectional view taken along the plane indicated by 8—8 in FIG. 6.
Figure 9:
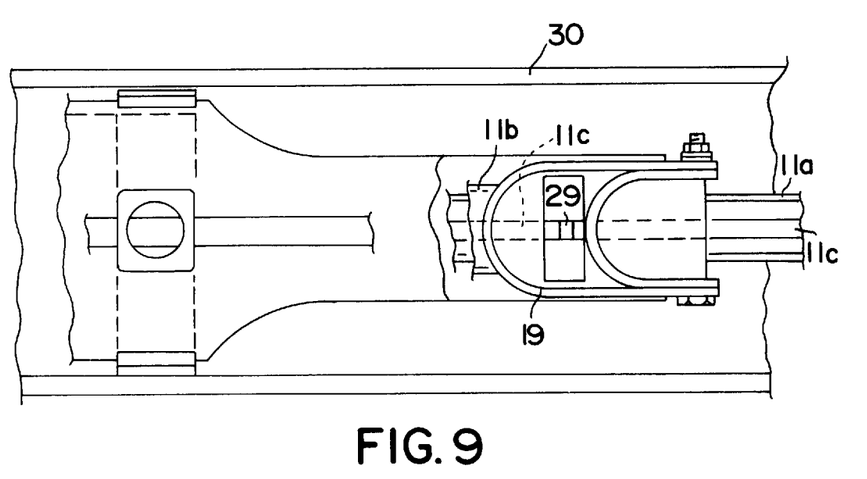
FIG. 9 is an elevational view in partial cross section illustrating the operation of the secondary jack screw.
Figure 9A:
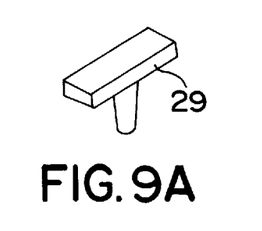
FIG. 9a is a perspective view illustrating the T-shaped lug used in achieving linear motion of the secondary jack screw.

As shown in FIG. 6, tubular shaft 11b which forms a second jack screw is externally concentric with jack screw 11a. As for the first jack screw, the outer wall of the second jack screw is also threaded along substantially its entire length. The second jack screw threadably engages barrel nut 25 fixedly attached to inner extension tube 27. As best can be seen in FIGS. 9 and 9a, a T-shaped drive lug 29 has the top of the "T" fixedly attached to the inner wall of second jack screw 11b. The first(inner) jack screw 11a has a groove 11c running along it longitudinal extent in which the bottom portion of the "T" slidably rides. Thus, the rotational motion of jack screw 11A is transferred to jack screw 11b while jack screw 11b slides along jack screw 11a thereby providing both linear and rotational motion of jack screw 11b.

As noted above, second jack screw 11b threadably engages barrel nut 25 which is fixedly attached to inner extension tube 27. Tube 27 has the fueling probe nozzle 28 on its distal end. Thus, rotational motion of jack screw 11b linearly drives tube 27. Stop members 32 (see FIGS. 6 and 8) extend from the inner wall of tube 18 to limit the forward motion of inner tube 27 relative to the middle tube.

Thus, inner tube member 27 and middle tube member 18 are linearly driven relative to each other and to fixed tube member 30 to an extended position. The tube members are driven to the retracted position within the fuel tank by reversing the rotation of the motor.

The aircraft fuel system distribution, critical to stability at low refueling speeds requires the capability of distributing fuel to both the internal and external fuel tanks. This is achieved pneumatically and is not effected while using the aerial refueling tank. During refueling, fuel is transferred to all internal tanks as it would with conventional wing mounted tanks. However, in order to provide fuel flow to the external fuel tank (pylon) on the opposite wing, a check valve 38(See FIGS. 10 and 11) may be installed in the fuel system of the aircraft. Check valve 38, as shown in FIG. 11, is a conventional three way, 2 position solenoid operated valve. This replaces the normally used one way valve that allows for the external tanks to be refueled through a conventional aerial refueling receptacle. The 3-way, 2 position valve allows both refueling through the aerial refueling tank and the aerial refueling receptacle.

Figure 10:
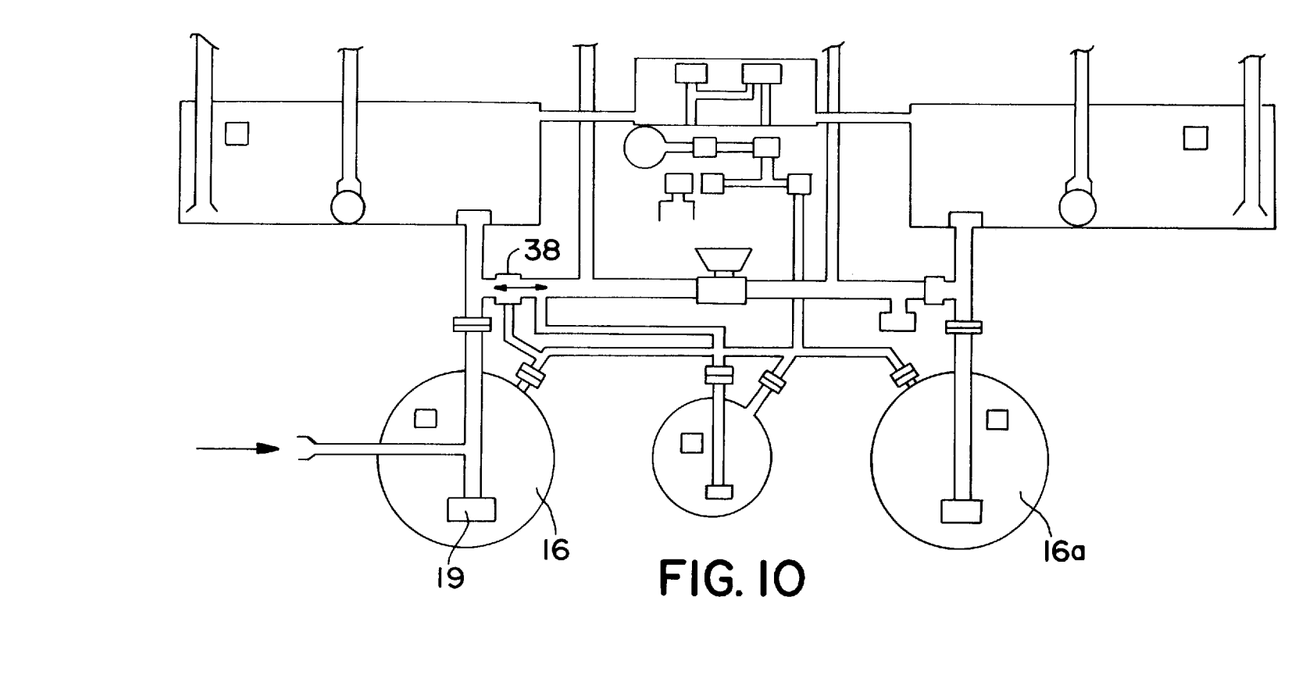
FIG. 10 is a schematic view illustrating the shutoff valve used in shutting off the flow of fuel to the wing tank when it is full and transferring additional fuel to other tanks.
Figure 11:
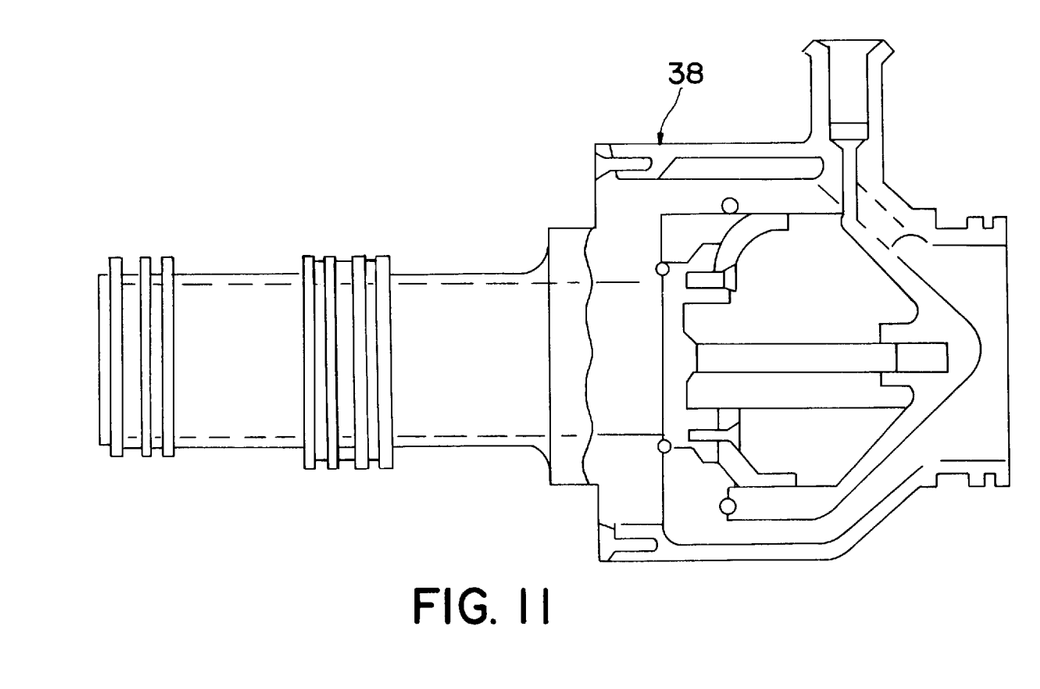
FIG. 11 is a side elevational view partly in cross section illustrating the details of the shutoff and transfer valve.

As shown in FIG. 10, a shutoff valve 19 is provided in the fueling system. This valve is open during refueling to transfer the fuel taken in by the probe to all internal and external tanks. When the refueling tank 16 is full, tank level sensors close valve 19 so that fuel is no long longer fed to tank 16 but rather transferred to the other external and internal tanks. Additionally, when all internal and external tanks are full and refueling is terminated, valve 19 opens to permit any residue of fuel inside the probe to be fed to tank 16.

Figure 12A:
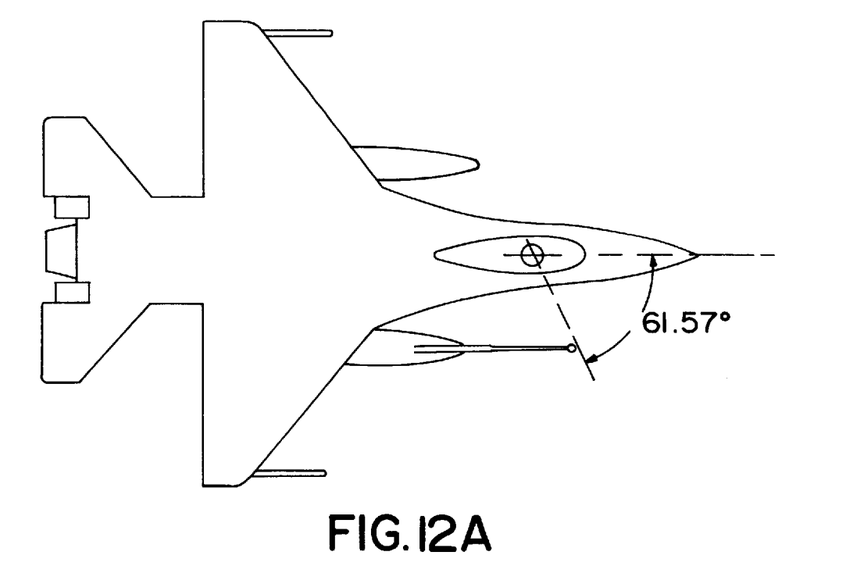
FIGS. 12a–12c are schematic illustrations showing the placement of the probe so that it can be viewed by the pilot.
Figure 12B:
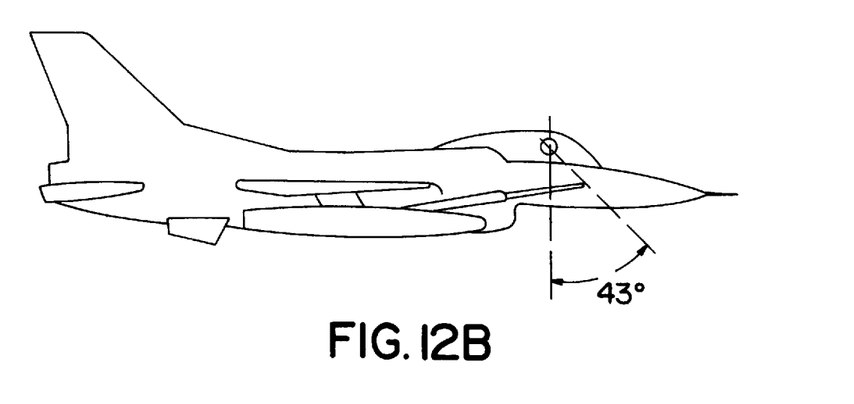
Figure 12C:
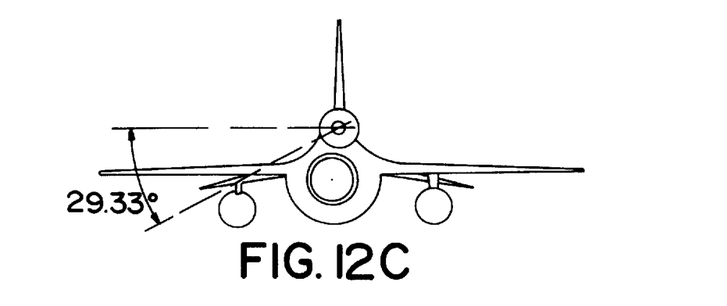

Referring now to FIGS. 12a–12c, the positioning of the probe so that it can be conveniently viewed by the pilot is schematically illustrated. As already noted, in connection with FIG. 1, the positioning of the probe determines this. Such positioning should be made so that the pilot faces the tanker and is able to view the probe. This is determined experimentally for each type of aircraft. These parameters are shown in FIGS. 12a and 12b for an F-16 aircraft, the angles shown being the pilot's viewing angle from the cockpit.

Figure 13:
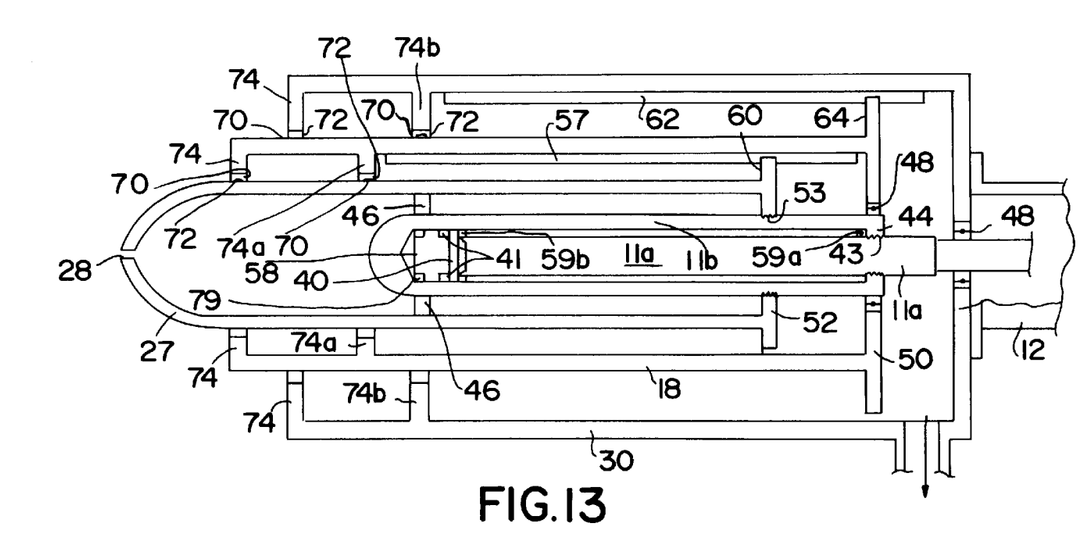
FIG. 13 is a schematic view of an alternative mechanism for extending and retracting the telescoping tubes showing the tubes close to the retracted position.
Figure 14:
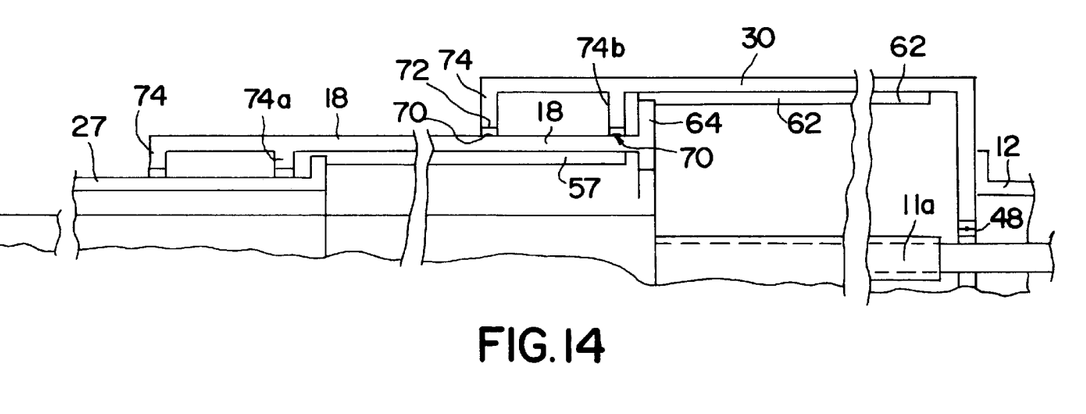
FIG. 14 is a schematic view of the alternative mechanism of FIG. 13 showing the tubes in the extended position.

Referring now to FIGS. 13 and 14 an alternate embodiment of the probe of the invention is schematically illustrated.

This probe is driven as in the first embodiment from a retracted to an extended position by a motor, with the rotation of the motor being transferred to linear motion by a jack screw which engages a nut fixed to at least one of the tubes. This embodiment has a different implementation from the first embodiment for the drive mechanism employed for driving the middle tube and for the drive between the first and second jack screw. The same numerals are used to identify like parts of this second embodiment and the first embodiment. FIG. 13 shows the probe in its almost fully retracted position while FIG. 14 shows the probe in the extended position.

Jack screw 11a is fixedly attached to the drive shaft of motor 12 which may be electrical or pneumatic. Jack screw 11a is threaded along substantially its entire length. Circular ring 40 is fixedly attached to the distal end of jack screw 11a, this ring having engagement or dog teeth 41 on the surface thereof. Jack screw 11b is hollow in form and is externally concentric with jack screw 11a. A capped portion 44 of jack screw 11b, located at one end thereof, has threads 43 on its inner surface which engage the threaded outer surfaces of jack screw 11a. The distal end of jack screw 11b is supported on the inner wall of inner tube 27 by means of slide bearings 46. Capped portion 44 is supported on a circular ring 50 by means of ball bearings 48. Circular end plate 58 of jack screw 11b has engagement or dog teeth 79 thereon. Fuel holes are provided in ring 50 and the slide bearing assembly to permit the passage of fuel therethrough.

Inner tube 27 has a circular ring 52 fixedly attached thereto which has a threaded portion 53 which engages the threads on the outer surface of jack screw 11b. Probe nozzle 28 is on the distal end of tube 27. Middle tube 18 has a keyway 57 running longitudinally along its inner wall into which a ring member 60 on the outer wall of inner tube 27 fits and rides along while preventing rotation of the inner tube. Fixed outer tube 30 has a similar such keyway 62 in which ring member 64 of middle tube 18 rides to prevent rotation of the middle tube. Slide bearings 70 and fuel seals 72 are provided between outer tube 30 and middle tube 18 and between middle tube 18 and inner tube 27, these bearings and seals being on the inner surfaces of circular rings 74 extending from the outer and middle tubes. Apertures are provided in all of the ring and bearing assemblies in inner tube 27 to assure the passage of fuel therethrough.

The device of the second embodiment of the invention operates as follows: In the fully retracted position (shown in FIG. 13 moving in the extend direction a little less than fully retracted), the dog teeth 59*a* on jack screw 11*a* engage opposing dog teeth 59*b* on jack screw 11*b*, effectively locking the two jack screws together. The threaded portion 53 of tube 27 engages the threads on the outer wall of jack screw 11*b*. The two jack screws will rotate together with tube 27 being driven through female threaded portion 53 which engages the threaded outer wall of jack screw 11*b*. Inner tube 27, as already noted, is prevented from rotating by virtue of the engagement of ring member 60 in keyway 57. Therefore, inner tube 27 will be driven linearly. When inner tube 27 has extended far enough ring member 60 will engage the opposing ring 74*a*. Middle tube 18 is connected to jack screw 11*b* by ball bearings 48 which permits jack screws 11*b* to rotate while middle tube 18 is prevented from rotating by keyway 57. The middle tube 18 will extend outwardly until its ring member 64 abuts against the opposing ring member 74*b* of outer tube 30 at which point the probe is fully extended as shown in FIG. 14.

The probe is retracted by reversing the direction of rotation of the motor. This causes rotation of the inner jack screw 11*a* in an opposite direction. Frictional forces prevent outer jack screw 11*b* from rotating resulting in retracting linear motion of the outer jack screw. As it retracts, the outer jack screw drives the keyed middle tube backwardly. Once the outer jack screw 11*b* is fully retracted, the engagement teeth on the inner and outer jack screws are driven together in mating engagement. This results in rotation of the outer jack screw 11*b* which now drives threaded portion 53 of the inner tube. As the inner tube has its ring 60 keyed in groove 57, it is prevented from rotating and rather moves linearly inwardly until it reaches the fully retracted position.

While the invention has been described and illustrated in detail, it is to be clearly understood that this is intended by way of illustration and example only and is not to be taken by way of limitation, the scope of the invention being limited only by the terms of the following claims.

We claim:

1. A system for use in refueling an airborne aircraft comprising:
    a fuel tank mounted on the body of the aircraft, said tank having a first compartment for carrying fuel and a second compartment which is isolated from said first compartment in liquid tight fashion,
    a motor mounted in said second compartment,
    an elongated shaft connected to the drive shaft of said motor, said shaft being rotatably driven by the motor,
    a stationary tube member,
    a plurality of movable tube members mounted concentrically on each other and within said stationary tube member for predetermined limited slidable motion relative to each other, one of said tube members having a probe nozzle formed on the distal end thereof,
    means for interconnecting said movable tube members together in driving relationship to each other,
    means for connecting said elongated shaft to said one of said tube members to drive said one of said tube members, and
    means for preventing rotational motion of said one of said tube members while effecting linear motion thereof in response to the drive of said shaft,
    said motor driving said tube members between a retracted position whereat all of said tube members are contained within said fuel tank and extended position whereat said tube members are fully extended outside of said fuel tank with the probe nozzle in a position to receive fuel.

2. The system of claim 1 wherein said one of said tube members in the innermost of said tube members.

3. The system of claim 1 wherein said fuel tank is a pylon mounted on a wing of said aircraft.

4. The system of claim 1 wherein said elongated shaft is threaded along substantially its entire length to form a jack screw and means fixedly attached to said one of said tube members which threadably engages said jack screw, and means for preventing rotation of said one of said tube members thereby causing linear motion of said one of said tube members.

5. The system of claim 4 wherein a second one of said tube members has means attached thereto for threadably engaging the jack screw formed by said elongated shaft, and means for preventing rotation of said second one of said tube members whereby said jack screw linearly drives said second one of said tube members.

6. The system of claim 1 wherein in the extended position, the probe extends out from said fuel tank at an angle and a distance such that the probe nozzle can be viewed from the aircraft cockpit.

7. The system of claim 1 wherein a second one of said plurality of tube members is driven in response to said drive shaft, and means for preventing rotational motion of said second one of said tube members while permitting linear motion thereof.

8. The system of claim 1 wherein a second one of said plurality of tube members is linearly dragged by said one of said tube members.

9. A system for the aerial refueling of an aircraft comprising:
    a fuel tank mounted on the aircraft,
    a fixed outer tube,
    an inner movable tube having a probe nozzle on its distal end for receiving fuel,
    a barrel nut fixedly attached to said inner tube,
    a middle movable tube having a barrel nut fixedly attached thereto, said middle tube being between said inner and outer tubes,
    said tubes being concentric with each other,
    an inner shaft threaded along the longitudinal extent thereof to form a jack screw, said inner shaft threadably engaging the barrel nut of said middle tube,
    an outer hollow shaft positioned in external concentricity with said inner shaft, the outside wall of said outer shaft being threaded to form a jack screw, said outer shaft threadably engaging the barrel nut attached to said inner tube,
    a liquid tight compartment within said tank,
    a motor mounted in said compartment,
    the drive shaft of said motor being connected to said inner shaft to effect rotation thereof, and
    means for interconnecting said inner and outer shafts to effect rotational drive of said outer shaft by said inner shaft with longitudinal movement of said outer shaft along said inner shaft, the inner shaft engaging the barrel nut of one of said movable tubes and the outer shaft engaging the barrel nut of the other of said movable tubes, whereby said motor drives said shafts and said shafts drive said tubes between a retracted position with said tubes and shafts fully within the tank and an extended position with said tubes extending outside of the tank to form a probe.

10. The system of claim 9 wherein the outer shaft engages the barrel nut of said inner tube and the inner shaft engages the barrel nut of said middle tube.

11. The system of claim 9 wherein the means for interconnecting said inner and outer shafts to effect rotational drive of said outer shaft comprises a drive lug fixedly attached to said outer shaft, said inner shaft having a groove running longitudinally therealong, said lug being slidably fitted in said groove for movement therealong and for rotatably driving said outer tube along with said inner tube.

12. The system of claim 9 wherein in the extended position the probe extends out from said fuel tank at an angle and at a distance such that the probe nozzle can be viewed from the aircraft cockpit.

13. A system for the aerial refueling of an aircraft comprising:

a fuel tank mounted on said aircraft, a fixed outer tube, an inner movable tube concentric with said outer tube and having a probe nozzle on its distal end for receiving fuel, a middle movable tube positioned between the inner and outer tubes and concentric therewith, an inner shaft threaded therealong to form a jack screw, an outer hollow shaft fitted over said inner shaft in external concentricity therewith, thread means on said outer hollow shaft for threadably engaging said inner outer shaft with said inner shaft, a liquid tight compartment within said tank, a motor mounted in said compartment, the drive shaft of said motor being connected to said inner shaft to effect rotation thereof, means for interconnecting said inner and outer shaft to effect rotational drive of said outer shaft by said inner shaft, means connecting said inner tube to said middle tube to prevent rotational motion between the inner and middle tubes but permitting linear motion of said tubes relative to each other, means connecting said middle tube to said outer tube to prevent rotational motion therebetween and permitting linear motion of said middle tube relative to said outer tube, mating stop and drive means on said inner and middle tubes which engage each other when said inner tube is linearly driven such that said inner tube drags said middle tube along with it linearly, and stop means on said middle and outer tubes which engage each other to stop the forward travel of said middle tube, whereby said motor drives said shafts and said shafts drive said tubes between a retracted position fully within said tank and an extended position extending outside of said tank to form a fuel probe.

14. The system of claim 13 wherein said means interconnecting said inner tube and said middle tube drive to prevent rotational motion therebetween but permitting linear motion comprises a ring member on said inner tube and a slot on said middle tube into which said ring member is fitted.

15. The system of claim 14 wherein said means for interconnecting said middle tube with said outer tube to prevent rotational motion therebetween but permitting relative linear motion comprises a keyway on said outer tube member and a ring on said middle tube member fitted in said keyway.

* * * * *

UNITED STATES PATENT AND TRADEMARK OFFICE
Certificate

Patent No. 5,810,292                                                       Patented: September 22, 1998

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Frank Garcia, Jr., Walter Nasarfnko, Herach Haroutunians and Derek J. Sheldrake.

Signed and Sealed this Sixth Day of April, 1999.

CHARLES T. JORDAN
*Supervisory Patent Examiner*
Art Unit 3641